Patented May 26, 1942

2,284,614

UNITED STATES PATENT OFFICE 2,284,614

PROCESS FOR IMPROVING CELLULOSE PRODUCTS

Johann Joseph Stoeckly, Teltow-Seehof, and Elmar Profft, Berlin-Lichterfelde, Germany, assignors to North American Rayon Corporation, New York, N. Y., a corporation of Delaware No Drawing. Application November 12, 1938, Serial No. 240,174. In Germany November 12, 1937

4 Claims. (Cl. 8—120)

This invention relates to a method of treating cellulose products so as to reduce their water-retaining characteristics.

Many processes are known to esterify cellulose to a low extent on its surface in order to impart to the cellulose products water-repelling qualities. To this end such products as cotton, wool, artificial silk, cellulose-wool and the like have been treated by chlorides, anhydrides, or amides of fatty acids dissolved in substances such as carbon tetrachloride, benzine, benzene and the like, in order to achieve a water-repelling effect, in those cases where it is possible to attach small quantities of long-chained, aliphatic residues by means of groups capable of reaction in the cellulose fibre. In addition, the desired result has been achieved by the use of anhydrides of fatty acid emulsified in an aqueous medium. After the treatment and after drying these products have been hardened for the purpose of firmly fixing the aliphatic chains in the cellulose fibres, i. e., they have been heated to higher temperatures of, for instance, 80–100° C., for one or several hours. Weak bases such as pyridine, chinoline, diethylaniline have sometimes been previously added to the organic medium in order to favour this process.

We have now found that a very useful effect can be produced by loading cellulose products such as viscose artificial silk, cellulose wool, (also in the form of webs or knittings or hosiery or artificial horse hairs, or films) with small quantities of primary organic bases such as aniline or secondary organic bases such as piperidine or tertiary bases such as pyridine and chinoline and treating the fibres thus prepared subsequently at an elevated temperature, in a suitable organic medium such as carbon tetrachloride, benzine, benzene, trichlor-ethylene, tetrachloracetylene and the like in which small quantities of higher halogenides of fatty acids, especially such having at least eight carbon atoms, for instance, lauroyl chloride, stearoyl chloride, lignoseroyl-chloride, palmitoyl chloride and the like or technical mixtures thereof, obtained, for instance, from technical stearine, spermaceti, sperm oil or hardened fish oil, are dissolved. Such cellulose products when dipped into water show a different molecular refraction than non-treated goods. They have a certain lustre, substantially smaller swelling characteristics and especially, when centrifuged, retain substantially less water. Normal cellulose wool when centrifuged in a predetermined manner, retains 85–90% of water. Cellulose wool, when treated preliminarily in the known above described manner and slightly kneaded in water shows very pronounced water-repelling properties, but when kneaded very thoroughly it absorbs the water very readily and retains similar percentages of water as non-treated fibres. On the other hand when treating the fibres in accordance with our novel process, the water-retaining property is reduced to 40 to 30% or even less. This water-retaining property compares very well with that of wool and, of course, it is of great practical importance, since clothes made from such treated material, for instance, when wetted, will dry more readily. Moreover, although the water-retaining property is so much reduced, the receptivity for substantive dyes of the treated cellulose products is not much reduced.

It is very striking that the said favourable effect produced by our novel process does not occur when the first step of the process according to the invention is carried out as above described but an after-treatment is made with anhydrides or amides of the fatty acids or neutral sulphuric acid esters of fatty alcohols instead of chlorides of fatty acids. Further, it has been found, that the effect will be most pronounced with certain proportions of the said agents. Advantageously the fibres are loaded in such a manner that they are treated with watery solutions of certain organic bases and evenly centrifuged. The products thus prepared are then brought into the organic medium in which the chloride of the fatty acid has been dissolved in a percentage to obtain a suitable density. Favourable results have been obtained by dipping the cellulose wool, in the first step of our novel process, in a solution of pyridine, chinoline, piperidine or aniline of 1 to 2% strength, and, in the second step, in an organic medium, for instance, carbon tetrachloride, in which stearoyl chloride has been dissolved, to obtain a solution of 0.75 to 1% strength. On the contrary, when three parts of stearoyl chloride and sixteen parts of cellulose wool are employed under the same conditions, and the amount of pyridine is reduced to one half to one tenth of the above percentage, the useful effect disappears almost entirely. Again, if under the above described circumstances, i. e., using a pyridine solution of 1% strength the amount of stearoyl chloride is reduced to one third of the above described percentage, the effect will also not appear. Furthermore, if under the above described circumstances, using a pyridine solution of 1% strength the amount of stearoyl chloride is increased to ten times the above described percentage, the effect disappears also almost entirely. After the treatment the stearoyl chloride which has not reacted and the hydrochloric acid formed by the reaction have to be removed.

According to a further feature, our novel process can be carried into effect in such a manner that while the reduced water-retaining power is maintained, the known stability when boiling is produced at the same time, by a suitable choice of the time and temperature of the treatment in the organic medium and the concentration of the halogenide of the fatty acid.

While we do not propose to offer a full theory of the chemical phenomena and effects hereinbefore mentioned, it may be stated that the small quantities of bases which have been brought into the cellulose products preliminarily are probably capable of introducing the halogenides of fatty acids into the interior of the cellulose. On the other hand, the small quantities of the fatty chains distributed in the interior of the cellulose apparently, due to their water repelling properties, tend to remove water which has invaded the interior, without destroying its real swelling power. It will thus be understood that the water-retaining power is reduced very substantially without materially reducing the receptivity for dyes.

*Example 1*

16 kgs. of viscose cellulose wool are dipped into 500 litres of water containing 6 kgs. of pyridine and left therein for a period of one hour, at room temperature. The dipping bath is drawn off and the cellulose wool is centrifuged to a weight of 30 kgs. This cellulose wool which is still wet is now dipped into 400 kgs. of carbon tetra-chloride in which 3 kgs. of stearoyl chloride are dissolved and treated in this solution for one hour, at a temperature of 50° C. Now the solution of carbon tetrachloride is drawn off, the cellulose wool is centrifuged vigorously, washed with a fresh amount of pure carbon tetrachloride in order to remove excessive stearoyl chloride and centrifuged. The quantities of hydrochloric acid still adhering to the cellulose are washed out with water, the cellulose wool is vigorously centrifuged and dried. The water-retaining power amounts to 33.5% instead of 85% in comparison with that of the original fibre.

*Example 2*

The process is carried out in the same manner as described in Example 1, but chinoline is used instead of pyridine. The water-retaining power is found to be 34%.

*Example 3*

Aniline is used instead of pyridine in Example 1. In this case a water-retaining power of 30% is obtained.

We are well aware that our process may be varied without departing from the spirit and scope of our invention, and we desire to include all modifications and variations coming within the scope of the appended claims.

We claim:

1. In a process of treating cellulose products of the group consisting of artificial silk, cellulose wool, and artificial horse hairs, the steps which comprise treating a regenerated cellulose with an aqueous solution of an aromatic base and subsequently reacting the treated cellulose with a non-aqueous solution of a halogenide of a fatty acid having at least eight carbon atoms, said aqueous solution containing about 1 to 2% by weight of said base and said non-aqueous solution containing about 0.75 to 1% by weight of said halogenide.

2. A process according to claim 1, in which the aromatic base is a primary, aromatic base.

3. A process according to claim 1, in which the aromatic base is a secondary aromatic base.

4. A process according to claim 1, in which the aromatic base is a tertiary, aromatic base.

JOHANN JOSEPH STOECKLY.
ELMAR PROFFT.